United States Patent [19]

Hirata

[11] Patent Number: 5,495,998

[45] Date of Patent: Mar. 5, 1996

[54] TAPE REEL STRUCTURE FOR MAGNETIC TAPE CASSETTE

[75] Inventor: Hidetoshi Hirata, Kanagawa, Japan

[73] Assignee: Fuji Photo Film Co., Ltd., Kanagawa, Japan

[21] Appl. No.: 194,022

[22] Filed: Feb. 9, 1994

[30] Foreign Application Priority Data

Feb. 9, 1993 [JP] Japan .................. 5-008739 U

[51] Int. Cl.⁶ ...................................... B65H 75/18
[52] U.S. Cl. ................... 242/614; 242/343; 242/610.6
[58] Field of Search .................. 242/343, 343.1, 242/343.2, 345.2, 610.6, 611, 611.1, 614, 614.1; 360/132

[56] References Cited

U.S. PATENT DOCUMENTS

| | | | |
|---|---|---|---|
| 2,247,881 | 7/1941 | Hatfield . | |
| 3,064,917 | 11/1962 | Roberts et al. | 242/610.6 |
| 3,591,102 | 7/1971 | Keiner | 242/614 |
| 3,695,541 | 10/1972 | Lee | 242/610.6 |
| 4,801,107 | 1/1989 | Dixon et al. | 242/343 |
| 4,993,655 | 2/1991 | Gelardi et al. | 242/610.6 |
| 5,004,180 | 4/1991 | Okamura et al. | 242/343 |
| 5,010,434 | 4/1991 | Schoettle et al. | 242/343 |
| 5,054,709 | 10/1991 | Sato . | |
| 5,180,116 | 1/1993 | Urayama et al. | 242/614 |

FOREIGN PATENT DOCUMENTS

| | | |
|---|---|---|
| 3343278C2 | 5/1992 | Germany . |
| 4172678 | 6/1992 | Japan . |

*Primary Examiner*—John P. Darling
*Attorney, Agent, or Firm*—Sughrue, Mion, Zinn, Macpeak & Seas

[57] ABSTRACT

In the magnetic tape cassette, upper and lower flanges 23a to 24c forming a tape reel 21 are formed alternately at a given angle in the two end portions of a reel hub 22 so that engaging gears 25a to 26c respectively formed on the outer peripheral edge portions of the upper and lower flanges 23a to 24c are substantially continuous in a plan view, and a brake claw is arranged so as to be engageable with any one of the engaging gears 25a to 26c regardless of the rotational position of the tape reel 21.

4 Claims, 3 Drawing Sheets ic tape to be wound therebetween and therearound, and a pair of engaging members respectively disposed on the outer peripheral portions of the lower flanges.

TAPE REEL STRUCTURE FOR MAGNETIC TAPE CASSETTE

BACKGROUND OF THE INVENTION

1. Field of the Invention

The present invention relates to a magnetic tape cassette and, in more particular, to a magnetic tape cassette in which a pair of tape reels for a magnetic tape to be wound therebetween and therearound and a pair of engaging members are improved.

2. Related Art

As known well, in a video unit such as a VTR and the like, there is often used a magnetic tape cassette including a pair of tape reels contained in a cassette case. The pair of tape reels each includes upper and lower flanges disposed on the upper and lower side surfaces of a reel hub which is a winding core barrel part. Formerly, for example, there was employed a structure in which lower flanges and a reel hub were formed integrally with each other while upper flanges were bonded to, welded to, or fitted with the other end side of the reel hub.

However, when the tape cassette has a structure in which the tape reel is to be assembled in the above manner, then the number of parts and the number of steps of operation are both increased and, therefore, there has been proposed such a tape reel 1 as shown in FIG. 5. That is, in the illustrated tape reel 1, a reel hub 2, lower flanges 3 and upper flanges 4 are formed integrally together.

The tape reels 1 are disposed side by side in a rotatable manner in upper and lower cassette halves (which are not shown) and a magnetic tape (not shown) is extended between and over the respective tape reels 1. Further, engaging gears 5 are formed on the outer peripheral portions of the lower flanges 3 and, in the neighborhood of the engaging gears, there are provided a pair of brake claws 11 which are used to stop the rotational movements of the tape reels 1.

The two brake claws 11 are disposed at right and left symmetrical positions with the right-and-left direction central line of the cassette case between them, and are also freely oscillatable along the bottom surface of the cassette. Each of the brake claws 11 includes a cylindrical rotary barrel portion 12, and a claw portion 13 and a moving portion 14 respectively formed integrally with the rotary barrel portion 12.

The rotary barrel portion 12 is inserted over a shaft 15 provided integrally with the lower cassette half and is supported in a freely rotatable manner. Also, a spring 16 is inserted through the shaft 15. One end of the spring 16 is secured to one end of the claw portion 13, while the other end thereof is secured to a fulcrum shaft 17 formed integrally with the lower cassette half. Further, although not shown, as known well, between the two brake claws 11 there is incorporated a pressure member which can be oscillated along a plane perpendicular to the bottom surface of the cassette to press against the moving portion 14. When the cassette is loaded into a recording and reproducing device, the pressure member is pushed up and rotated by a lever or the like which comes in from the device.

While the cassette is not in use, the claw portion 13 is energized by the spring 16 into engagement with the engaging gear 5, whereby the two tape reels 1 are prevented from rotating. On the other hand, if the cassette case is loaded into the recording and reproducing device, then the moving portion 14 is pushed in a direction of an arrow A by the pressure member to remove the engagement between the claw portion 13 and engaging gear 5 against the energizing force of the spring 16, thereby allowing the two tape reels 1 to be rotated.

Next, referring to the manufacture of the tape reel 1, the tape reel 1 is integrally molded by such a metal mold 61 as shown in FIG. 6. That is, the tape reel 1 is molded by injecting resin into an injection space formed between an upper metal mold 7 and a lower metal mold 8 and, in order to form the upper flanges 4 integrally, there are provided projecting core portions 9 which are to be inserted through openings 6 formed in the lower flanges 3, respectively.

In order to form the engaging gear 5 in the lower flanges 3, the outer peripheral portions of the lower flanges 3 must be continuous and, for this reason, the diameter of the upper flange 4 cannot help but be smaller than the diameter of the lower flange 3. Also, in the core portion 9, there is provided a removing slope which facilitates the removal of the upper and lower metal molds 7, 8. Even according to this structure, the diameter of the upper flange 4 is smaller than the diameter of the lower flange 3, as can be seen clearly from FIGS. 5 and 6.

In the above-mentioned structure that there is a difference between the diameters of the upper and lower flanges 3 and 4, for example, if a magnetic tape is wound full to the lower flange 3 having a larger diameter, then the magnetic tape is forced out. In this case, the winding of the magnetic tape gets out of shape, which unfavorably provides a cause to damage the tape. This limits the quantity of winding of the magnetic tape to be wound round the tape reel 1.

However, when the removing slope of the metal mold and the strength of the lower flange 3 are taken into consideration, then there is a limit to increasing the diameter of the upper flange 4. If the diameter of the upper flange 4 is daringly increased, then the opening 6 is expanded accordingly, which decreases the thickness of the outer peripheral portion of the lower flange 3. As a result, when the claw portion 13 is engaged with the engaging gear 5, there is increased the possibility that the forming position of the opening 6 can be broken and thus the reliability of the tape reel can be impaired.

On the other hand, in Japanese Patent Publication No. Hei. 2-122486, there is disclosed a proposal to solve the above-mentioned problems, in which a projection is provided in part of the periphery of the upper flange 4. However, this proposal cannot solve the above problems radically and the problems are still left unsolved.

SUMMARY OF THE INVENTION

In view of the above-mentioned circumstances, the present invention aims at eliminating the problems found in the conventional magnetic tape cassette. Accordingly, it is an object of the invention to provide a magnetic tape cassette of an integral molding type which allows a tape reel to be positively engaged with an engaging claw without incurring any problem, allows a magnetic tape to be wound a large quantity round the tape reel, and prevents the winding of the magnetic tape from getting out of shape.

The above and other objects are achieved by a provision of a magnetic tape cassette of an integral molding type which, according to the invention, includes a pair of tape reels to be disposed within a cassette case and each having upper and lower flanges formed on the end portions of a winding core barrel part the tape reel, allowing a magnetic tape to be extended between and round the pair of tape reels, and also includes two brake claws each engageable with each of the two tape reels to stop the rotational movement of the tape reel, in which each of the tape reels is arranged such that the upper and lower flanges thereof are formed alternately and partially when viewed from a reel rotary shaft direction, the outer peripheral edges of the lower flanges and the outer peripheral edges of the upper flanges are substantially continuous with one another when viewed from the reel rotary shaft direction, engaging gears are formed on the whole areas of the upper and lower flanges outer peripheral edge portions, and the brake claws each includes a claw portion engageable with the engaging gears of the lower flanges as well as with the engaging gears of the upper flanges.

DESCRIPTION OF THE PREFERRED EMBODIMENTS

The preferred embodiments of the invention will now be described with reference to FIGS. 1 to 4.

Figure 1:
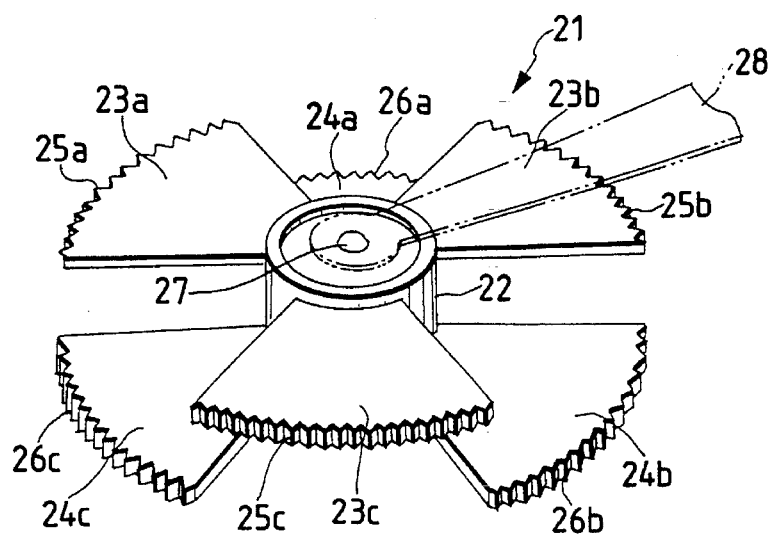
FIG. 1 is a perspective view of a tape reel included in an embodiment of a magnetic tape cassette according to the invention.
Figure 2:
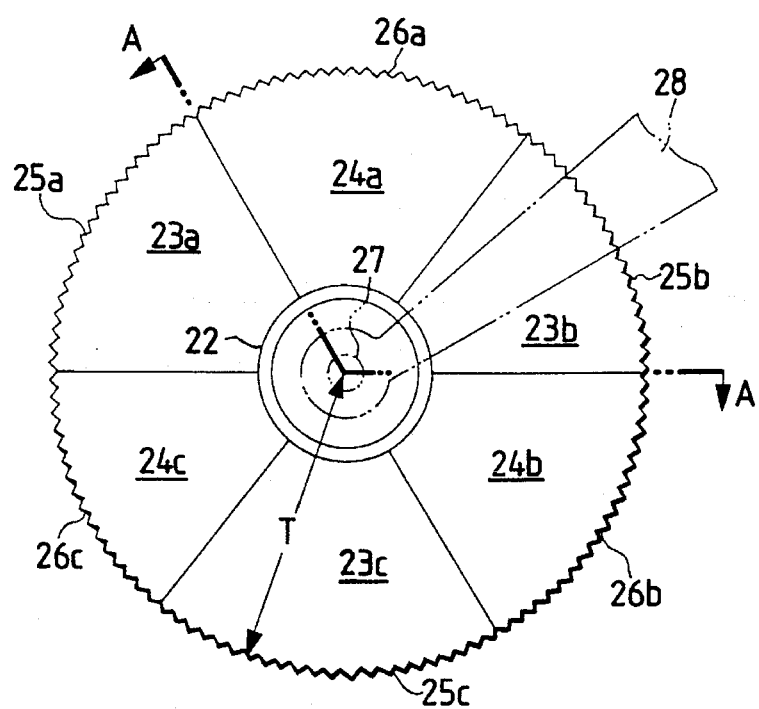
FIG. 2 is a plan view of the tape reel shown in FIG. 1.
Figure 3:
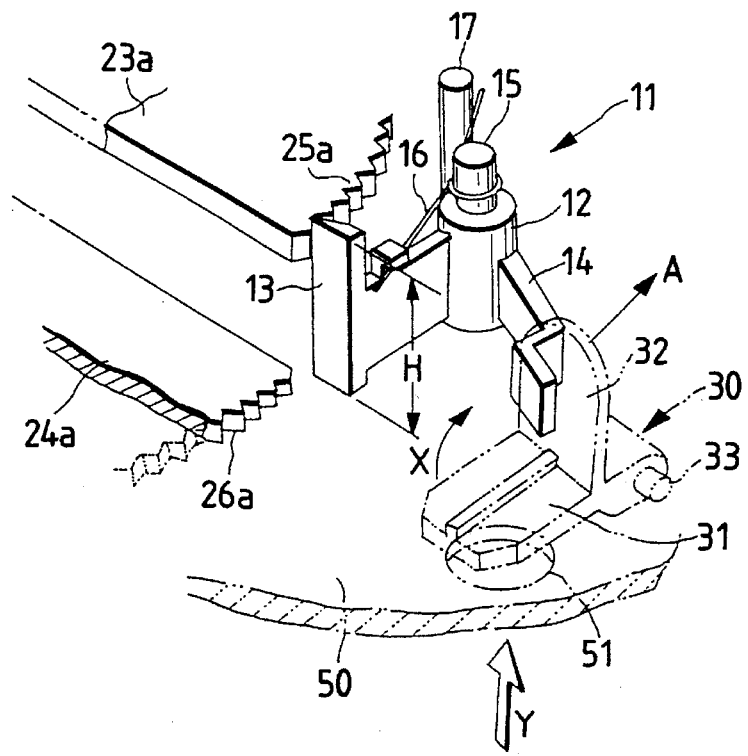
FIG. 3 is a perspective view of main portions of the tape reel, showing the operation of engaging gears and a brake claw.
Figure 4:
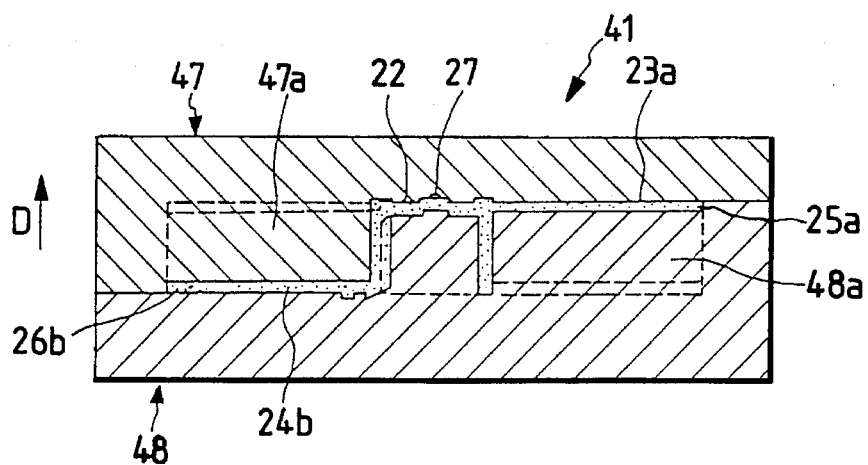
FIG. 4 is a section view of main portions of a metal mold for molding the tape reel shown in FIG. 1.

FIG. 1 is a perspective view of a tape reel for use in a video cassette of a VHS system, FIG. 2 is a plan view of the tape reel shown in FIG. 1, and FIG. 3 is a partial perspective view of the tape reel and a brake claw, showing the engagement relation between them. Also, FIG. 4 is a section view of main portions of a metal mold which is used to mold the tape reel integrally. Here, in the description of the present embodiment, parts corresponding to those used in the above-mentioned conventional magnetic tape cassette are given the same designations and the description thereof is omitted.

The tape reel 21 in the present embodiment includes three fan-shaped upper flanges 23a, 23b and 23c on the upper end portion (where a pivot portion is arranged) of a cylindrical reel hub 22 or a winding core barrel part, and three fan-shaped lower flanges 24, 24b and 24c on the other end portion thereof (which is hereinafter referred to as the lower end portion). And, engaging gears 25a to 25c are formed on the outer peripheral edge portions of the upper flanges 23a to 23c, while engaging gears 26a to 26c are formed on the outer peripheral edge portions of the lower flanges 24a to 24c.

The upper flanges 23a to 23c and lower flanges 24a to 24c respectively have an angle of 60° as the opening angle of the fan, and are disposed at regular intervals. For this reason, although the upper and lower flanges are actually arranged such that the respective outer peripheral edge portions thereof are not continuous but intermittent, as shown in FIG. 2, when viewed from the reel shaft direction, the upper and lower flanges mutually make up for their intervals or clearances to thereby provide a continuous circular flange with few intervals between them. Now, it should be noted here that, in fact, even if one or more clearances of several mm or less are formed due to the removing taper structure of the metal molding, the clearances have no substantial influence on the function of the engaging gears.

It should be noted here that not only the upper flanges 23a to 23c but also the lower flanges 24a to 24c do not have continuous outer peripheral edge portions. This means that, when the upper flanges 23a to 23c are molded integrally with the lower flanges, it is not necessary to make the outside diameters (T) of the upper flanges 23a to 23c smaller than the outside diameters of the lower flanges 24a to 24c.

That is, because the outer peripheral edge portions of the lower flanges 24a to 24c need not be continuous with one another, when the tape reel 21 is molded, the core portion of the metal mold extending from the lower flange side can be structured such that it is completely free from the limits of the outside diameters of the lower flanges 24a to 24c. As a result of this, the plane shape of the tape reel 21, as shown in FIG. 2, can be formed such that the upper flanges 23a to 23c are almost continuous with the lower flanges 24a to 24c, and thus the engaging gears 26a to 26c can also be structured as if they were continuous.

Here, description will be given below of the molding of the tape reel 1. A metal mold 41 shown in FIG. 4 is composed of an upper metal mold 47 (a movable metal mold) and a lower metal mold 48 (a fixed metal mold). A section of the metal mold shown in FIG. 4 is a section taken along the line A—A in FIG. 2.

Unlike the structure of the above-mentioned conventional metal mold in which the core portion 9 is projected out so as to cross the injection space for molding the lower flanges, the metal mold 41 is structured such that three fan-shaped core portions 47a forming a metal mold space for molding the lower flanges are projected downwardly (in FIG. 4) in the upper metal mold 47, while three core portions 48a forming a metal space for molding the upper flanges are projected upwardly (in FIG. 4) at alternate positions with the core portions 47a in the lower metal mold 48.

According to the metal mold 41, by separating the upper and lower metal molds from each other (actually, by moving the upper metal mold 47) after the molten resin is injected, the tape reel 21 shown in FIG. 1 can be molded at a time.

Figure 5:
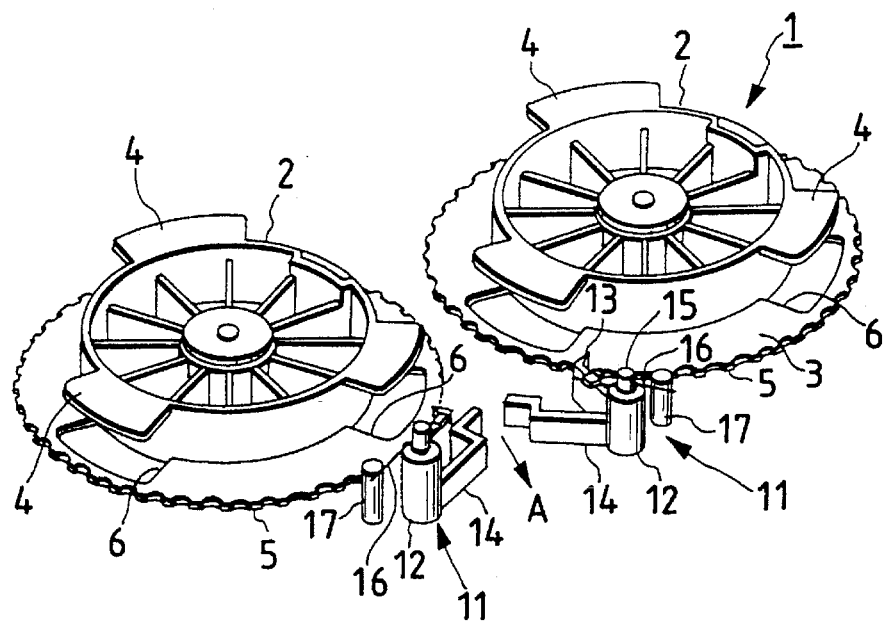
FIG. 5 is a perspective view of a conventional tape reel.
Figure 6:
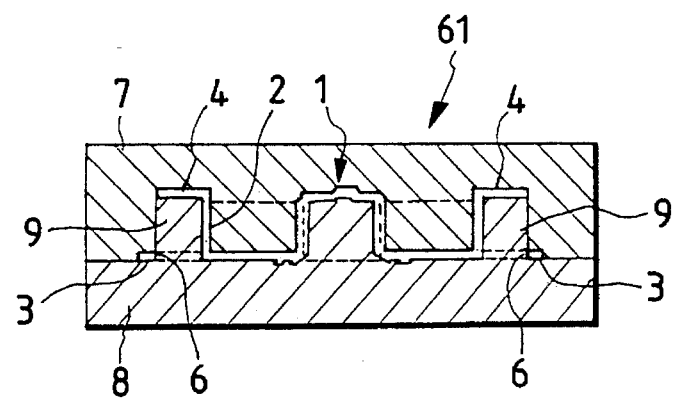
FIG. 6 is a section view of a metal mold for molding the conventional tape reel.

Although in FIG. 1 there is shown only one tape reel 1, of course, in fact, a pair of tape reels 21 are disposed side by side in such a manner as shown in FIG. 5 is a cassette case consisting of upper and lower cassette halves, as shown in FIG. 5. And, a projection-like pivot portion 27 is provided in the central portion of the upper end portion of the reel hub 22 and the leading end portion of a leaf spring 28 for pressing against a pair of tape reels 21 elastically and rotatably is in contact with the pivot portion 27 as shown by imaginary lines, so that the tape reels 21 are pressed toward the bottom surface 50 of the cassette.

Next, description will be given below of a relation between the tape reel 21 and brake claw 11 with reference to FIG. 3.

The brake claw 11 is arranged as follows: that is, the height H of the claw portion 13 thereof, as shown in FIG. 3, is set such that the claw portion 13 are capable of being engageable with both the upper flanges 23a to 23c and the lower flanges 24a to 24c. Actually, however, because the upper flanges 23a to 23c and lower flanges 24a to 24c are formed alternately, even if the claw portion 13 is set to have the height H, the claw portion 13 will never be engaged with the upper and lower flanges simultaneously but, for example, when the upper end portion of the claw portion 13 is in engagement with the engaging gear 25a of the upper flange gear 23a, in most cases, the lower end portion of the claw portion 13 will not be engaged with the lower flange side.

Also, when the lower end portion of the claw portion 13 is in engagement with any one of the engaging gears 26a to 26c, the upper end portion of the claw portion 13, in most cases, will not be engaged with any one of the upper flanges 23a to 23c.

However, if the engaging position of the claw portion 13 happens to be, for example, one of the end portions of the engaging gears 26a to 26c in the lower flanges 24a to 24c, that is, in position(s) where the upper and lower flanges change place with each other, the two upper and lower engaging gears are to be engaged with the claw portion 13.

As described above, due to the fact that the engaging gears 25a, 25b, 25c, 26a, 26b and 26c are substantially continuous with one another and also that the claw portion 13 is capable of being engaged with any one of these engaging gears, the rotational movement of the tape reel 1 can be stopped positively.

The remaining portions of the structure of the brake claw 11 are the same as those of the conventional one except for the structure of the claw portion 13. The brake claw 11 is mounted in the following manner: that is, for example, as shown in FIG. 3 (although actually a pair of brake claws are disposed as shown in FIG. 5, only one of them is shown in FIG. 3), the rotary barrel portion can be rotated about the shaft portion 15 in such a manner that the claw portion 13 is energized by the spring 16. And, at a position corresponding to the moving portion 14, as shown by imaginary lines, there is disposed a pressure member 30 in such a manner that it can be oscillated about the rotary shaft 33 thereof along a plane intersecting perpendicularly to the cassette bottom surface 50. The pressure member 30 comprises a first tongue piece portion 31 extending so as to cover a hole 51 formed in the cassette bottom surface 50 and a second tongue piece portion 32 engageable with the leading end portion of the moving portion 14, while the first and second tongue piece portions 31 and 32 are formed so as to have an angle substantially equal to a right angle with respect to each other.

And, when the cassette case is loaded into the recording and reproducing device, if a rod-shaped member is moved from the lower side of the cassette bottom 50 through the hole 51 to push up the first tongue piece portion 31, then the pressure member 30 is rotated in a direction of an arrow X so that the second tongue piece portion 32 presses against the moving portion 14o As a result, if the moving portion 14 is driven in a direction of an arrow A, then the claw portion 13 is rotated against the energizing force of the spring 16 to thereby remove the engagement between the engaging gear and the claw portion, so that the tape reel 1 can be rotated.

As described above, according to the present embodiment of the invention, the upper and lower flanges are formed alternately at a given angle when viewed from the reel shaft direction and, therefore, the present tape reel can be molded integrally by means of a very simple metal mold structure which allows the upper and lower metal molds to be separated from each other in the reel shaft direction. Also, according to the present reel plan shape, not only the outer peripheral edge portions of the upper and lower flanges are substantially continuous but also there is provided the brake claw including the claw portion which can be engaged with any one of the engaging gears formed in the outer peripheral edge portions of the upper and lower flanges, so that the brake claw can be engaged with any one of the engaging gears at any time regardless of the rotational position of the tape reel. Further, according to the invention, although the tape reel 1 can be rotated and also the rotational movement of the tape reel 1 can be stopped similarly to the conventional one, such opening 6, which is formed on the inside of the engaging gear as in the conventional tape reel, is not formed at all in any of the lower flanges 24a to 24c, thereby eliminating the possibility that the strength of each of these engaging gears can be lowered.

Although description has been given of an embodiment of a magnetic tape cassette according to the invention, the present invention is not limited to the embodiment but various modifications are possible. For example, the number of the upper and lower flanges 23a to 24c is not limited to the above-mentioned number but other number of flanges, for example, four upper flanges and four lower flanges can also be formed. Also, the shape of the flange is not limited to the fan shape.

Further, in the illustrated embodiment, the claw portion 13 is formed such that it has a given height (H) in the vertical direction. However, alternatively, the claw portion 13 can be formed in a two-piece structure that the respective piece portions thereof are engageable with the upper and lower flanges separately.

As has been described heretofore, according to the present invention, since the tape reel is structure such that the upper and lower flanges are formed alternately at a given angle when viewed from the reel shaft direction, the present magnetic tape cassette can be molded integrally by a very simple metal mold structure which allows the upper and lower metal molds to be separated from each other in the reel shaft direction. Also, because the plan shape of the present tape reel is arranged such that the outer peripheral edge portions of the upper and lower flanges are substantially continuous and also because there is provided the brake claw including a claw portion which is engageable with any one of the engaging gears formed on the upper and lower flanges outer peripheral edge portions, even if the upper and lower flanges are arranged such that the respective outer peripheral edge portions thereof are not continuous, the brake claw can be engaged with any one of the engaging gears at any time regardless of the rotational position of the tape reel.

Therefore, there is no difference between the diameters of the upper and lower flanges and, when compared with a conventional tape reel of an integral molding type, the winding diameter of the magnetic tape can be set larger for the flange diameter. Also, due to the fact that no opening is formed at all on the inside of any of the engaging gears of the upper and lower flanges, there is eliminated the possibility that the strength of the flange can be lowered, which increases the strength of the whole tape reel, prevents the flange against breakage when it is engaged by the brake claw, and thus enhances the reliability of the present magnetic tape cassette.

What is claimed is:

1. A method of molding a tape reel for a magnetic tape cassette, said tape reel is provided with a hub for winding a magnetic tape, and a plurality of upper flange members and lower flange members vertically spaced from said upper flange member, said upper and lower flange members are formed alternately when viewed from the winding direction of said magnetic tape, and outer peripheral edge portions of said lower flange members are substantially continuous with outer periphery edge portions of said upper flange members when viewed from a reel rotary shaft axial direction, comprising steps of:

preparing an upper movable mold and a lower stationary mold, said upper mold having a plurality of first core members for molding said lower flange members, and said lower mold having a plurality of second core members for molding said upper flange members, said first and second core members are alternately disposed such that the outer peripheral edge portions of said lower flange members are formed substantially continuous with the outer periphery edge portions of said upper flange members and each of said upper and lower flange members comprises a gear member at an outer peripheral edge thereof;

injecting molten resin into cavities formed by said core members and said mold; and separating said upper mold from said lower mold thereby forming said hub, and said upper and lower flange members of said tape reel at the same time.

2. The method of claim 1, wherein each of said upper and lower flange members comprises three fan-like shaped flanges.

3. A magnetic tape cassette comprising:

a housing;

a pair of tape reels disposed in said housing, each of said tape reels comprising:

a hub rotatably mounted within said housing for winding magnetic tape;

a plurality of upper flange means extending outward from said hub;

a plurality of lower flange means extending outward from said hub, said lower flange means being vertically spaced apart from said upper flange means for allowing said magnetic tape to wind between said upper and lower flange means; and wherein each of said upper and lower flange means is provided with a gear member at an outer peripheral edge thereof.

4. The magnetic tape cassette of claim 3, further comprising a pair of brake claws disposed outside said flange means, said brake claws having a certain vertical length engaging with gear members of both said upper and lower flange member.

* * * * *